Jan. 19, 1932.  C. CONE  1,841,715

SHEET GLASS APPARATUS

Filed Dec. 15, 1930

INVENTOR
Carroll Cone

BY Frank Fraser

ATTORNEY

Patented Jan. 19, 1932

1,841,715

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed December 15, 1930. Serial No. 502,289.

The present invention relates to improvements in sheet glass forming apparatus.

This invention has utility when incorporated in a rolling machine for producing sheet glass wherein a pair of horizontally arranged forming rolls are positioned above a mass of molten glass preferably closely adjacent to the surface thereof, said rolls being spaced from one another to create a sheet forming pass therebetween and being positively driven in a manner to draw a relatively heavy body of glass upwardly from the molten mass and reduce it to a sheet of substantially predetermined and uniform thickness. In order that proper formation of the sheet may take place, it is essential that sufficient glass be supplied to the forming rolls in order that an actual rolling of the glass may be achieved.

An important object of the invention is the provision of means for facilitating the supplying of the molten glass to the forming rolls whereby the requisite amount of glass necessary at the sheet forming pass to permit an actual rolling thereof will be assured.

Another object of the invention is the provision of means whereby hotter glass may be obtained and also whereby the tendency toward stagnation of the glass in the working receptacle, and particularly at the closed end thereof, may be reduced to a minimum.

A further object of the invention is the provision of means by the use of which larger forming rolls than heretofore used may be employed and hence a wider sheet produced.

Other objects and advantages of the invention will become more apparent during the course of the following description when taken in connection with the accompanying drawings.

Figure 1:
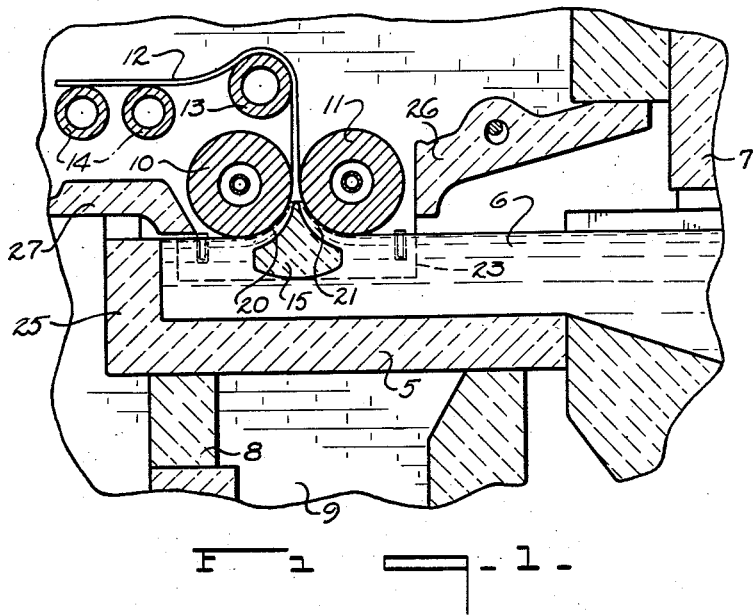
Figure 2:
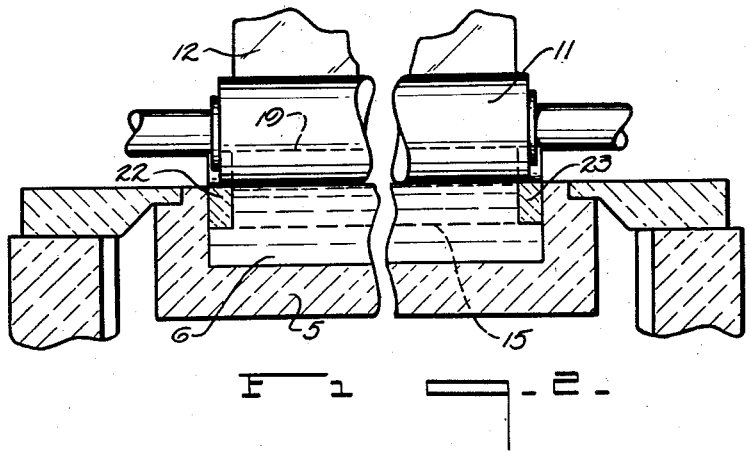
Figure 3:
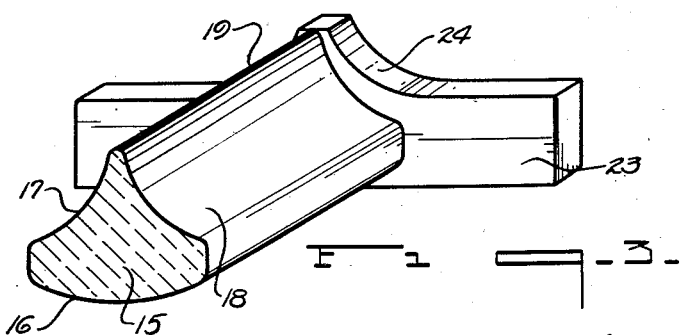

In the drawings forming a part of this application and wherein like numerals are employed to designate like parts throughout the same, Fig. 1 is a vertical longitudinal section through glass rolling apparatus constructed in accordance with the present invention, Fig. 2 is a transverse section therethrough, and Fig. 3 is a perspective sectional view of the guide bar or tongue.

Referring now to the drawings, 5 designates a relatively shallow working receptacle or pot containing a mass of molten glass 6 supplied thereto from any suitable type of glass melting furnace 7. The working receptacle 5 is ordinarily supported upon stools 8 arranged in a suitable heating chamber 9.

Positioned above the mass of molten glass 6 is a pair of sheet forming rolls 10 and 11, said rolls being preferably positioned relatively close to the surface of the molten mass 6, as shown, with their transverse axes preferably in substantial horizontal alignment. The forming rolls are spaced from one another to create a sheet forming pass therebetween, the width of which determines the thickness of sheet produced.

The rolls 10 and 11 are also preferably positively driven and, upon rotation thereof, are adapted to draw a relatively heavy body of glass upwardly from the molten bath 6 and reduce the same to a sheet 12 of substantially predetermined and uniform thickness. As herein shown, the sheet is continued upwardly for a relatively short distance beyond the forming rolls and is then deflected about a rotatable member or roll 13 into a substantially horizontal plane, wherein it is supported and carried along upon a series of horizontally arranged conveyor rolls 14 into an annealing leer (not shown). Of course, if desired, the bending roll 13 may be omitted and the sheet 12 deflected about roll 10 into an inclined plane and thence about the first conveyor roll 14 into the horizontal plane. The forming rolls 10 and 11 are also preferably hollow so that a suitable temperature control medium may be circulated therethrough and one of said rolls, preferably roll 11, may be yieldably urged toward roll 10 so that the rolls may be separated temporarily such as by the passage of a piece of clay or the like therebetween.

In accordance with the present invention, a guide bar or tongue 15 is disposed within the mass of molten glass 6 directly beneath the drawing point or base of the sheet. As shown in the drawings, this guide bar has a rather wide and substantially flat or slightly curved lower surface 16 and side walls 17 and 18 which converge upwardly toward one another to an edge 19. The guide bar projects above the level of the molten mass of glass 6 and is received between the lower portions of the forming rolls 10 and 11. The side walls 17 and 18 of the guide bar 15 are curved and the curvature thereof corresponds substantially to that of the forming rolls 10 and 11, the said side walls of the guide bar being spaced from the rolls to provide curved passages 20 and 21 therebetween through which two streams of molten glass are drawn upwardly, said streams being united at the top of the guide bar to form the base or meniscus of the sheet. The guide bar 15, while shown as being of solid refractory form, may be made hollow, if desired, and either internally cooled or heated.

The guide bar 15 has secured to its opposite ends the transverse end members 22 and 23 which fit against the side walls of the working receptacle 5 and may be secured thereto in any suitable manner. The central portions of the transverse end members 22 and 23 also project with the guide bar 15 above the level of the molten glass 6, and the upper surfaces of the said end members are cut away at each side of the guide bar as at 24 to facilitate the positioning of the forming rolls closely adjacent to the surface of the molten glass.

In glass drawing receptacles of the type illustrated, and when the guide bar 15 is not used, the supplying of molten glass to the closed end 25 of the receptacle 5 beyond the point of draw must obviously flow beneath the surface toward this end since the surface glass is being drawn upwardly. There is a tendency for the greater portion of the upper flow of glass into the sheet to be from the end toward the furnace, thereby resulting in stagnation of the glass in the closed end of the receptacle. With the use of the guide bar or tongue 15, however, the flow of glass from the furnace will be divided thereby, the upper portion being deflected through the passage 21 and the remainder of the glass flowing beneath the guide bar toward the far or closed end 25 of the receptacle from where the other half of the sheet is drawn up through the passage 20. In this manner, equal flows of glass into both sides of the sheet will be secured and, since a forced circulation of glass in the closed end of the receptacle is maintained, the tendency toward stagnation and the formation of dog metal will be reduced to a minimum.

Due to the provision of the guide bar 15, the supplying of the molten glass to the sheet forming rolls will be greatly facilitated and a sufficient amount of glass will at all times be supplied to the sheet forming pass to permit of an actual rolling thereof. Also, considerably larger rolls may be used than heretofore and hence a wider sheet produced. In addition to the above, the guide bar 15 also serves to prevent the line of generation of the sheet from shifting back and forth in the molten glass 6. In order to protect the mass of molten glass 6, forming rolls 10 and 11, and sheet 12, cover tiles 26 and 27 may be positioned above the receptacle at opposite sides of the forming rolls.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a mass of molten glass, a pair of forming rolls arranged above the molten glass in a manner to create a sheet forming pass therebetween, said rolls being adapted to draw a body of glass upwardly from said mass and reduce it to a sheet of substantially predetermined thickness, and a guide bar submerged within the molten glass beneath said forming rolls and having a portion thereof projecting upwardly therebetween.

2. In sheet glass apparatus, a receptacle containing a mass of molten glass, a pair of forming rolls arranged above the molten glass in a manner to create a sheet forming pass therebetween, said rolls being adapted to draw a body of glass upwardly from said mass and reduce it to a sheet of substantially predetermined thickness, and a guide bar submerged within the molten glass beneath said forming rolls and having a portion thereof projecting above the level of the molten mass and received between the forming rolls.

3. In sheet glass apparatus, a receptacle containing a mass of molten glass, a pair of forming rolls arranged above the molten glass in a manner to create a sheet forming pass therebetween, said rolls being adapted to draw a body of glass upwardly from said mass and reduce it to a sheet of substantially predetermined thickness, and a guide bar submerged within the molten glass beneath said forming rolls and having its side walls converging upwardly toward the center thereof and terminating at a point between said rolls.

4. In sheet glass apparatus, a receptacle containing a mass of molten glass, a pair of forming rolls arranged above the molten glass in a manner to create a sheet forming pass therebetween, said rolls being adapted to draw a body of glass upwardly from said mass and reduce it to a sheet of substantially predetermined thickness, and a guide bar submerged within the molten glass beneath said forming rolls and having its side walls converging upwardly toward the center thereof and terminating above the level of the molten mass and between the forming rolls.

5. In sheet glass apparatus, a receptacle containing a mass of molten glass, a pair of forming rolls arranged above the molten glass in a manner to create a sheet forming pass therebetween, said rolls being adapted to draw a body of glass upwardly from said mass and reduce it to a sheet of substantially predetermined thickness, and a guide bar submerged within the molten glass beneath said forming rolls and having curved side walls converging upwardly toward the center thereof and terminating at a point between said rolls, the curvature of the side walls of said guide bar corresponding substantially to that of the rolls and being spaced therefrom to provide passages therebetween through which two streams of glass are drawn upwardly, said streams uniting upon leaving the guide bar.

6. In sheet glass apparatus, a receptacle containing a mass of molten glass, a pair of forming rolls arranged above the molten glass in a manner to create a sheet forming pass therebetween, said rolls being adapted to draw a body of glass upwardly from said mass and reduce it to a sheet of substantially predetermined thickness, and a guide bar submerged within the molten glass beneath said forming rolls and having curved side walls converging upwardly toward the center thereof and terminating above the level of the molten mass and between the forming rolls, the curvature of the side walls of said guide bar corresponding substantially to that of the rolls and being spaced therefrom to provide passages therebetween through which two streams of glass are drawn upwardly, said streams uniting upon leaving the guide bar.

Signed at Toledo, in the county of Lucas and State of Ohio, this 10th day of December, 1930.

CARROLL CONE.